June 29, 1926.

H. WILD 1,590,461

OPTICAL APPARATUS

Filed June 15, 1921    3 Sheets-Sheet 1

Inventor:
Heinrich Wild
By
Atty.

June 29, 1926.

H. WILD

OPTICAL APPARATUS

Filed June 15, 1921

Inventor:
Heinrich Wild,
By Henry [illegible]
Atty.

June 29, 1926.　　　　　　　H. WILD　　　　　　　1,590,461
OPTICAL APPARATUS
Filed June 15, 1921　　　　3 Sheets-Sheet 3
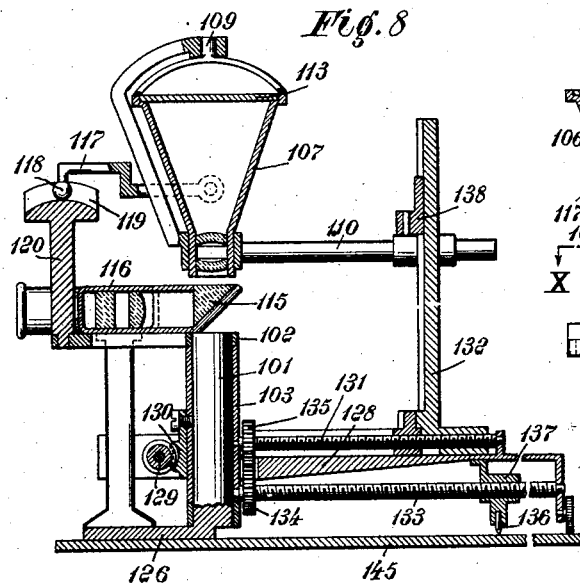
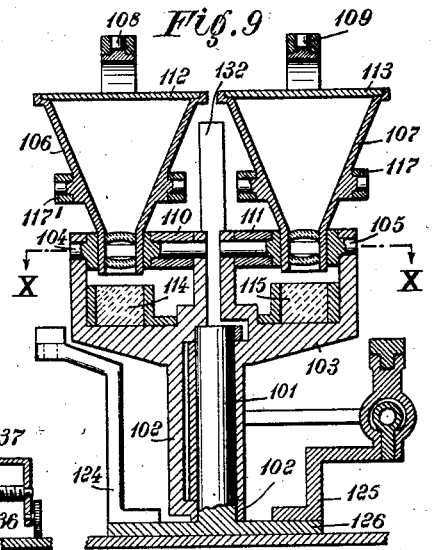
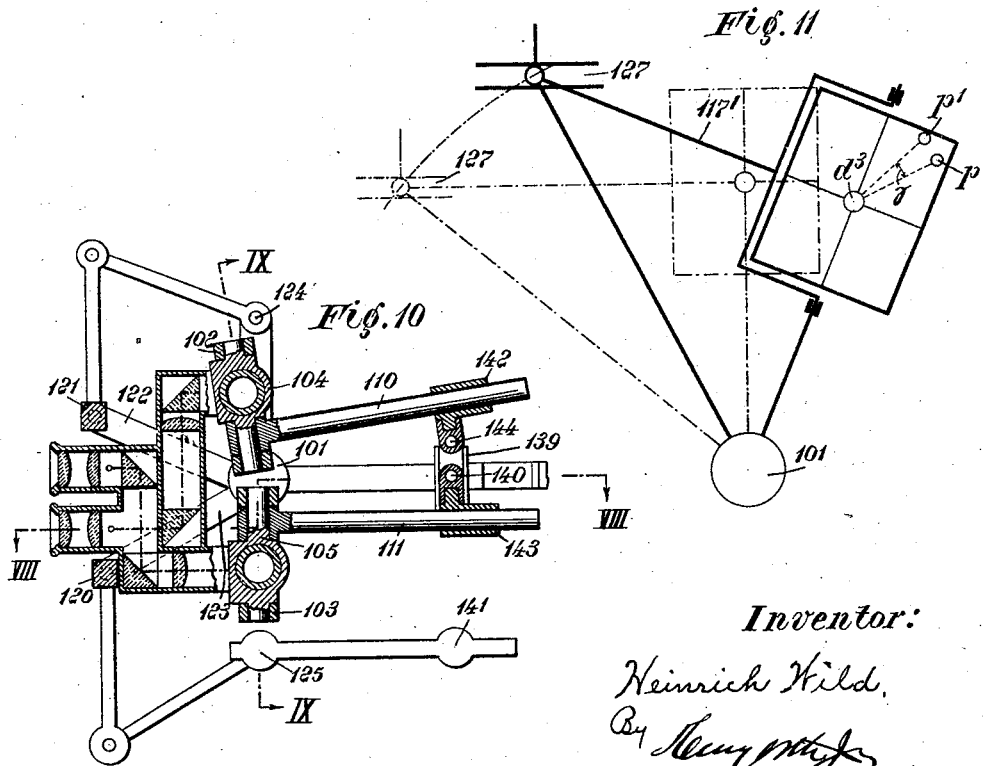
Inventor:
Heinrich Wild,
By
atty.

Patented June 29, 1926.

1,590,461

UNITED STATES PATENT OFFICE.

HEINRICH WILD, OF HEERBRUGG, SWITZERLAND.

OPTICAL APPARATUS.

Application filed June 15, 1921, Serial No. 477,780, and in Germany August 23, 1920.

This invention relates to improvements in optical apparatus and consists of a device for ascertaining the configuration and the projections thereof of two photographic images taken at the ends of a base-line at different angles. The present invention gives a very simple solution of the problem and consists in adjusting each of the two photographs in the focal plane of a photographic objective which is similar to the objective with which the photographs have been taken in such a manner that the rays diverging from the image point are converted into parallel rays behind the objective. If two image holders were to be placed beside each other in such a manner that their respective positions are exactly like those in which the photographs have been taken, the principal rays of all the bundles of rays which start from the corresponding image points would always intersect each other in a point and the total number of all these points would yield a true analogous copy of the surface or configuration of the object photographed.

But when the two ray systems are subjected to the stereoscopic method for a construction accelerating operation and increasing accuracy, considerable difficulties arise in designing the binocular telescopes, as the two optical axes have to perform an angular turning in one direction as well as a tilting in another direction.

Provision may be made to cause the two image holders to perform the movement in one direction so that the direction of the optical axes in the binocular telescope would have to be moved in the other direction only. Even in this case the difficulties are still very considerable so that apparatus working on this method do not present a sufficiently simple solution of the problem.

The present invention makes use of a third possibility of solving the problem, i. e., the optical axes of the binocular telescope maintain their directions when the device is used, that is to say the binocular telescope remains stationary and the necessary movements are performed by the two image holders.

To this end two links which represent lines parallel to the long sides of a triangle of calculation, are coupled to each other and each link is adapted to turn about two main axes. Each link transmits its movements to its respective image holder so that the relative positions between the directions of the axis of said holder and of the link are maintaned. This parallelism in the movements of the image holder and the link enable a very simple design of the whole apparatus, however, errors, in the projection of points on the image that are off the axes will appear. This error in the projection shows itself in such a way that all the points of the image which are outside the cross wires in the direction of the axes occupy an incorrect position with regard to the optical axes of the binocular telescope. The error increases with an increasing distance of the image point from the cross wires and reaches the highest degree in the four corners of the image. This error can be rectified by optical rectifying means or in a mechanical way. The optical rectifying means may for instance consist of turnable glass wedges or displaceably arranged low power lenses, which are provided between the image holders and the binocular telescope whereby their movement is made dependent on the movement of the links. The fact, however, that the incorrect and the correct image points are always situated on circles concentric to the axis of the image holder suggests a simpler mechanical rectification by adapting each image holder to turn about its optical axis and by causing this turning movement to be effected automatically by means of a rectifying device through an amount which corresponds to the error in the projection for every point of the image. The rectifying device has to be coupled with both axes of the corresponding link or of the image holder. Such a device may be constructed in various ways for instance so that each image holder and each link are adapted to be turned around a stationary and a movable axis. The base line may be adjusted in this special case either by varying the distance of the two stationary axes of the links or by varying the distance in a coupling member. The movements of the links must be transmitted by special devices for instance by parallelograms to the image holders.

In a preferred arrangement each image holder and its respective link have common main turning axes and each holder can be rigidly connected with the link. The number of the axes is thus reduced by one half and the transmitting devices are dispensed with. The two stationary (vertical) axes must be arranged at such a distance that the links do not obstruct each other even when adjusted to the shortest distance. The coupling member is of a very simple design in this case.

When the coupling member has to act as base-line and when the photograph taken from the left end of the base line is placed into the right hand image holder and vice versa the links do not move toward each other but away from each other when the distances become shorter. The binocular telescope has then to be constructed so that the right hand eye piece corresponds to the left hand entrance opening and vice versa. The coupling member is to be moved parallel to itself in this case.

A further simplification may be attained by providing a main turning axis that is common to both links.

In order to obtain smallest over-all dimensions and thereby reduce the weight of the apparatus, reflecting systems may be provided between the objectives of the image holders and the binocular telescope, which systems only take part in the turning movement about one of the main axes of turning. Hence the image holders may be arranged in such a position that they do not obstruct other parts of the device and that they do not cause the dimensions of the apparatus to be increased.

To the same effect it is advantageous to cause the movements of an elevation slide by means of a polar arm of variable length. This polar arm has one main axis in common with one of the links.

If this polar arm be connected to a second polar arm so that both arms carry out angular movements about the same axis and of the same magnitude and if provision be made that the radial movements of the ends of the two polar arms are in a finite adjustable ratio which ratio remains unaltered during the utilization of the apparatus, it is possible apart from the adjustment of the base line to a definite scale to produce an enlarged or reduced analoguous copy. This arrangement is preferably adapted in order to obtain small dimensions of the apparatus and especially to obtain short lengths of the two links as only the end of the second polar arm carries out the necessary large movements.

The base of the device may be arranged so that the whole apparatus rests on a base plate leaving free a sufficient area of the drawing plane on the side of the polar arm; further a mark may be provided at the axis of the polar arm so that the pole of the device can be set to any point of the drawing table.

Three constructional examples of the apparatus according to the invention are illustrated on the accompanying drawings, in which:

Fig. 1 is a horizontal section along line I—I of Fig. 2,

Fig. 2 is a vertical section along line II—II of Fig. 3 and Fig. 3 is a vertical section along line III—III of Fig. 1.

Fig. 8 is a vertical longitudinal section along line VIII—VIII of Fig. 10 of a third exemplification of the invention Fig. 9 is a vertical cross-section along line IX—IX of Fig. 10, Fig. 10 is a horizontal section along line X—X of Fig. 9.

Fig. 11 is a diagrammatic sketch showing the action of the rectifying device.

Figure 2:
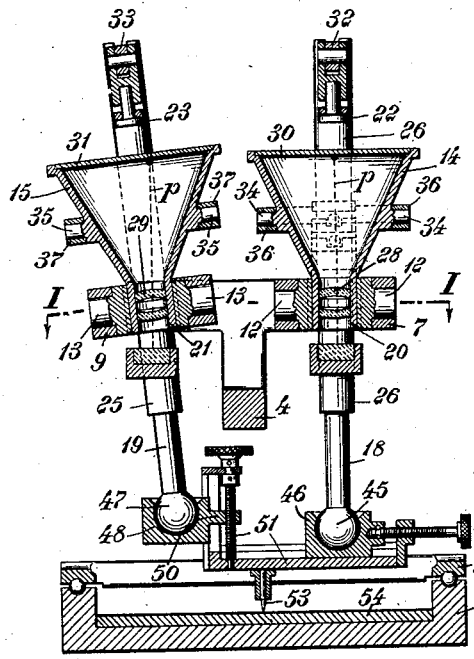
Figs. 1, 2 and 3 show a first constructional example.
Figure 3:
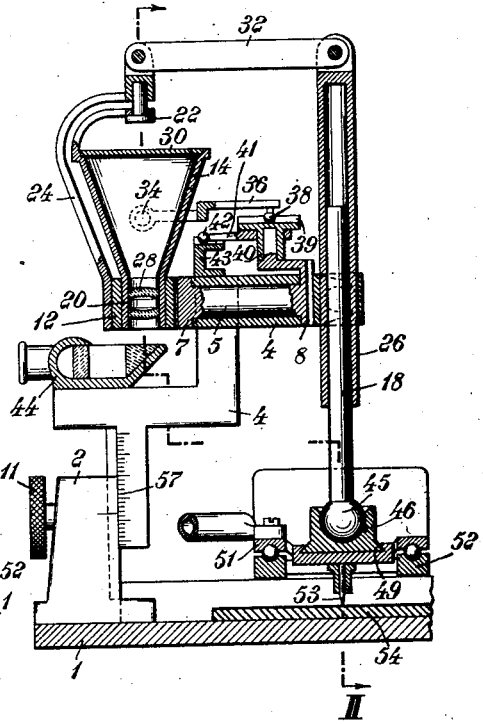
Figure 1:
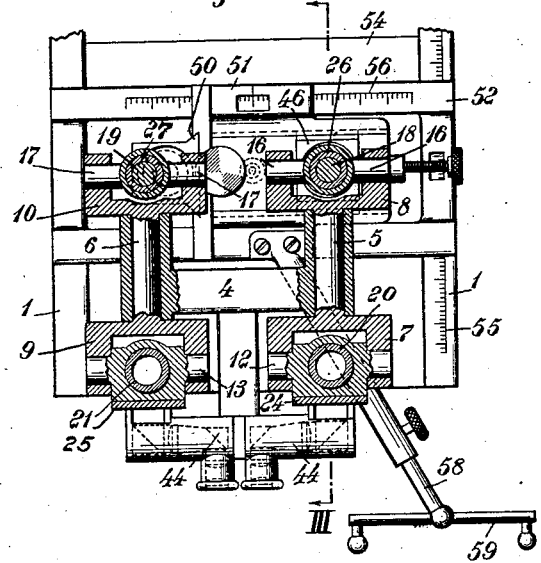
Figure 5:
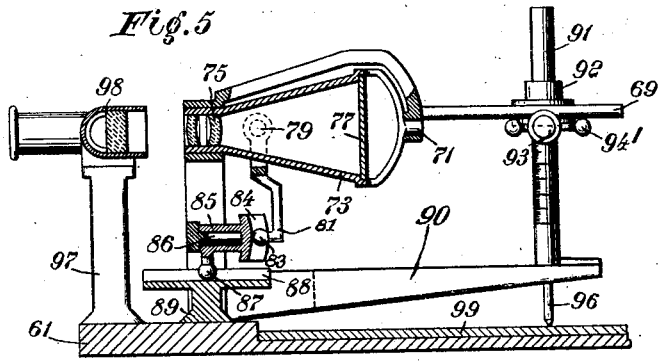
Fig. 5 is a vertical longitudinal section along line V—V of Fig. 4.

Referring to Figs. 1–3, 1 denotes a base plate, to which a standard 2 is fixed. A main supporting bracket 4 is adapted to slide in a vertical direction in the standard 2, and in this main bracket the horizontal axes of the device are rotatably mounted, these axes consisting of cylindrical pins 5 and 6 which are provided at their ends with forks 7, 8 and 9, 10 respectively. The bracket 4 can be raised or lowered by means of a gear actuated by a milled thumb screw 11. In the forks 7 and 9 the horizontal axes 12 and 13 respectively of the image holders 14 and 15 respectively are rotatably mounted, and in the forks 8 and 10 the axes 16 and 17 of the links 18 and 19 respectively are journalled. The image holders 14 and 15 are further provided with cylindrical hollow pins 20 and 21 respectively that carry lens objectives and which are concentrically arranged in their longitudinal axes and are rotatably mounted in the horizontal axes 12 and 13 respectively. The pins 22 and 23 are rigidly connected to the image holders 14 and 15 respectively and are adapted to rotate in parts 24 and 25 rigidly fixed to the members 12 and 13 respectively. The longitudinal axes of the image holders defined by the ends of the pins 20, 22 and 21, 23 respectively are thus rotatably mounted in the horizontal axes 12 and 13 and are arranged at right angles to the latter. The axes 16 and 17 act as journals for the hollow parts 26 and 27 of the links 18 and 19, the parts 18 and 26 and the parts 19 and 27 being adapted to be displaced relatively to each other in their longitudinal direction.

The image holders 14, 15 are provided with the objectives 28 and 29 arranged inside the hollow pins 20 and 21, and to the opposite side of the image holders the photographic plates 30 and 31 are fitted. The two arms 32 and 33 connect the axes 16 and 17 of the links 18 and 19 with the corresponding axes 20, 22 and 21, 23 respectively of the image holders. Each image holder 14 and 15 respectively is further provided with two lateral pins 34 and 35 respectively which act as fulcrums to forked levers 36 and 37 respectively of the rectifying device. The other end of the forked lever is provided with a spherical part 38 sliding in a horizontally arranged groove 39 of a member 40, which member 40 is provided with an arm 41 the spherical end of which slides in a groove 42 of a standard 43. The latter is fixed to the main bracket 4 and does not take part in a turning motion of the axes 5, whereas upon a turning of the latter the member 40 is turned as well and as it is retained to some degree by means of the arm 41 being in engagement with the stationary groove 42, the member 40 is turned about its vertical axis by an amount which depends on the angular turn of the axis 5. Upon a tilting movement of the longitudinal axis of the image holder 14 about the axis 12 the forked arm 36 slides along the groove 39 and turns the axes 20, 22 of the image holder 14 in correspondence with the turning motions about the two principal axes by an amount equal to the error of the projection. In the binocular telescope 44 which is diagrammatically illustrated by its optical systems and which is rigidly fixed to the bracket 4 the points $p$ of the image which correspond to the positions of the links are then properly adjusted.

The two links 18 and 19 are provided at their lower ends with a universal joint consisting of balls 45, 47 and sockets 46, 48 respectively, the socket 46 of the link 18 being fitted to the base-line slide 49 and the socket 48 of the link 19 being fitted to the elevation slide 50, both slides being adapted to be adjusted in guide parts of the coupling member 51. The latter is designed as a slide displaceably mounted on a further slide 52 which is adapted to move on the base plate 1. A drawing pencil 53 is provided on the lower side of the slide 51 and marks automatically on a drawing plane 54 the projections of all the image points $p$ to which the binocular telescope 44 is focused.

Graduations 55 may be provided on the base plate 1 and graduations 56 and 57 may be provided on the slide 52 and on the bracket 4 and the three coordinates of every image point $p$ can be read on the respective graduations.

The movement of the coupling member 51 can be effected by means of an adjustable arm 58 which projects to the outer side of the apparatus so that its handle 59 is always at a convenient position.

In the second constructional example illustrated in Figs. 4–7, 61 denotes the base plate fitted with a stationary vertical axis 62; the base-line slide 63 rests on the base plate and is adapted to turn around the axis 62, a second displaceable vertical axis 64 being slidably arranged in the slide 63. Brackets 65 and 66 are rotatably arranged about the vertical axes 62 and 64 respectively and carry the horizontal axes 67 and 68 respectively. To the horizontal axes 67 and 68 the two links 69 and 70 are connected, and the links can be clamped to said axes, which are further adapted to support the axes 71 and 72 of the image holders 73 and 74. In this manner a rigid and adjustable connection between the axis of each image holder and its corresponding link is effected. The image holders are provided with the photographic objectives 75, 76 and with the photographic plates 77, 78. The image holders 73, 74 are each provided with two lateral pins 79, 80 serving as fulcrums to the forked levers 81, 82 of the rectifying device. The lever 81 is provided at its end opposite to the forked end with a spherical part 83 which slides in a vertically arranged groove 84 of the member 85, the latter being rotatably mounted on a pin 86 which is rigidly connected to the bracket 65. The member 85 is provided with a spherical part 87 sliding in a horizontal groove 88 of a stand 89 (Fig. 7) the latter being fixed to the base plate 61. Upon a turning motion of the bracket 65 around the vertical axis 62 the spherical part 87 is displaced along the fixed groove 88 and causes the vertical groove 84 to take up an oblique direction. Upon a tilting of the axis 71 of the image holder 73 about the horizontal axis 67 the spherical part 83 of the forked lever 81 slides along the grooves 84 which is now in an oblique direction and causes a turning motion of the axis 71 of the image holder which is dependent on the turning motions around the vertical axis 62 and the horizontal axis 67 previously performed.

Rigidly fixed to the bracket 65 there is a polar arm 90 on which the device 91 for adjusting the elevations can be displaced in a radial direction. Along the device 91 which has an outer cylindrical face the coupling member can be displaced, which coupling member substantially consists of a circular disc 92 fitted with two horizontal pins 93 and 94. The pins 93 and 94 can be turned around the vertical axis of the device 91 and they are always adjusted to be vertical to the links 69 and 70 by means of the parts 94' and 95. A drawing pencil 96 is provided in connection with the device 91. The polar arm 90 and the device 91 can be provided with scales.

Figure 4:
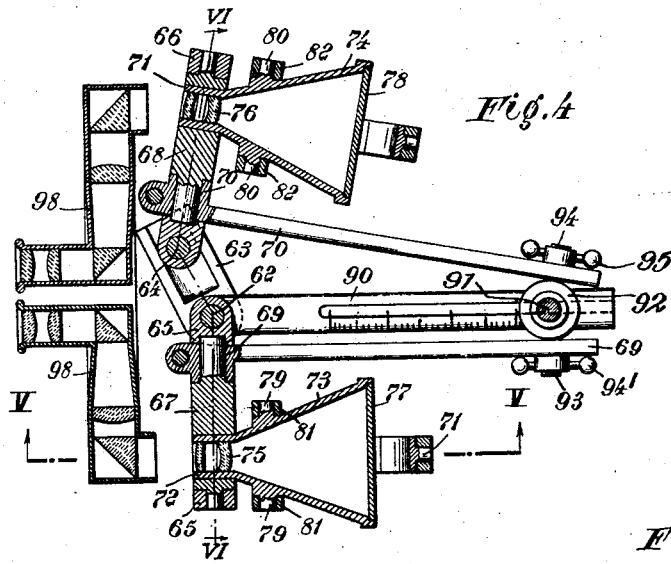
Fig. 4 shows a horizontal section along line IV—IV of Fig. 6 of a second constructional example of the device.
Figure 6:
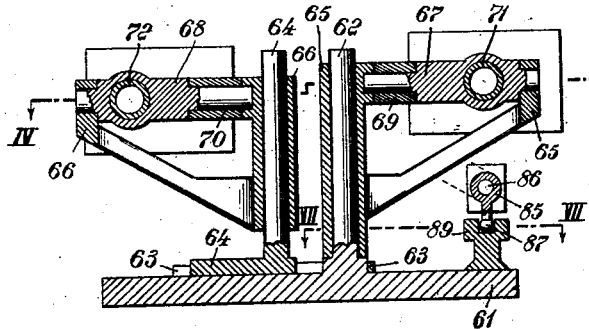
Fig. 6 is a vertical cross-section along a broken line VI—VI of Fig. 4.
Figure 7:
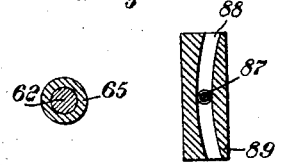
Fig. 7 shows a detail of the correcting device in a section along line VII—VII of Fig. 6.

A stand 97 fixed to the base plate 61 carries the binocular telescope 98 the optical parts of which are diagrammatically shown in Fig. 4.

The drawing pencil 96 marks on a drawing board 99 the projections of those points which are focused simultaneously by the cross wires in the binocular telescope.

In the third constructional example illustrated in Figs. 8-11 two brackets 102 and 103 are rotatably mounted around a common vertical axis 101, which brackets carry the horizontal axis 104 and 105 respectively. The axes 108, 109 of the image holders 106, 107 are arranged vertically. The two links 110, 111 are again adapted to be clamped to the horizontal axes. The left hand image holder 108 carries in this case the photographic plate 112 taken from the right hand end of the base-line and the plate 113 taken from the left hand end of the base-line is inserted in the right hand image holder 109. Two prisms 114, 115 are fixed on the brackets 102, 103 respectively, and thus take part in the turning movement in the horizontal plane, but not in the tilting movement of the plate holders. The binocular telescope 116 is so constructed that the right eye piece coacts with the left image holder and vice versa. The forked lever 117 of the rectifying device is arranged in a horizontal direction and is provided with a spherical part 118 adapted to slide in a horizontal groove 119 of the member 120. The vertical axes of the members 120, 121 are connected to the respective brackets 102, 103 by means of arms 122, 123 so that they take part in the turning movement in the horizontal direction. The stands 124, 125 are rigidly connected to the base plate 126 and form together with the vertical axis 101 the two fixed points of the parallelogram guide for adjusting the two members 120, 121 of the rectifying device, by these means the adjustment is carried out so that the grooves 119 and 127 are always parallel to their initial positions. The effects of the rectifying device may be seen from the diagrammatic sketch shown in Fig. 11. When the bracket 102 is turned around the vertical axis 101 the horizontal groove 127 is displaced from the position shown in dotted lines into the position shown in full lines and forms an angle with the forked lever 117' the size of which corresponds approximately to the angular extent of the turning motion of the bracket 102. When the image holder is now tilted the spherical part of the forked lever slides along the groove 127 and the axis of the image holder is turned. If the rectifying device were not provided the point $p^1$ instead of the correct point $p$ of the image would be intersected by the optical axis of the binocular telescope. The turning of the axis of the image holder through the angle $\delta$ caused by the rectifying device shifts the correct point $p$ into the optical axis of the binocular telescope whereby the error in the projection is eliminated.

The polar arm 128 is rigidly connected to the bracket 102 and can be turned around the vertical axis 101 by means of a worm gear 129, 130. A screw threaded spindle 131 is mounted in the polar arm 128 by which the elevation member 132 can be displaced in the radial direction. A second screw threaded spindle 133 is carried in the bracket 103 and is actuated upon a rotation of the spindle 131 by means of toothed wheels 134, 135. The drawing pencil 136 is fitted to a sleeve 137 provided with internal thread and engaging with the spindle 133, and as this spindle has a greater pitch than the spindle 131, the drawing pencil 136 will perform magnified movements as compared with the radial movement of the member 132. This second polar arm which consists essentially of the screw threaded spindle 133, its bearings and the drawing pencil can be easily exchanged so that several such second polar arms with spindles of different pitch and, if desired, also toothed wheels of different ratio can be utilized in the apparatus.

The coupling member 138 slides along the part 132 in a vertical direction. To the coupling member 138 there is fitted the base-line slide 139 which is guided by the parallelogram 103—140—141—125 so that no turning movement in the horizontal plane occurs. Holders 142, 143 for the links 110, 111 are rotatably arranged around the vertical axes 140, 144.

The base-plate 126 on which the whole device is mounted does not cover the part of the drawing board 145 at the side of the polar arm and is fitted with a centre mark, which may be set on any desired point of the drawing board.

By the crossing of the lines of sight in Figs. 8-10 the movements of links 110 and 111 are reversed. This enables the part 132 to be brought as near as possible to the vertical axis 101, the links moving away from one another while part 132 moves toward the axis.

I claim:

1. An optical apparatus, in combination, a binocular telescope, two image holders each fitted with an objective and each adapted to hold an image taken at the ends of a base line at different angles, means mounting said telescope and holders relatively to each other so that the image is seen upon looking through the telescope, two links, each link being operatively connected to one of the image holders, means mounting each holder and its link for universal turning to turn said image holders into positions corresponding to the angles at which the images were taken, and rectifying means operatively connected to each image holder for eliminating the errors in the projection arising from the parallelism of movements between image holders and links.

2. An optical apparatus, in combination, a stationary binocular telescope, the two optical systems of which being arranged cross-wise so that the left hand entrance opening of the telescope coacts with the right hand exit opening and vice versa, two universally movable image holders arranged beside each other each fitted with an objective and each adapted to hold a photographic plate of two photographs taken at different angles at the ends of a base line the plate of the photograph taken at the left end of the base line being fitted to the right hand image holder and vice versa, means mounting said image holders and telescope with respect to each other so that the image is seen when looking through the telescope, two links adapted to be universally turned about axes to turn the image holders into positions corresponding to the angles at which the photographs were taken, one of said axes being common to each image holder and its respective link, each link being operatively connected to an image holder, means to effect a rigid connection between each image holder and its respective link, and rectifying means operatively connected to each image holder for eliminating the errors in the projection arising from the parallelism of movements between image holders and links.

3. An optical apparatus, in combination, a stationary binocular telescope, two image holders each fitted with an objective and adapted to hold each a photographic plate of two photographs taken at different angles at the ends of a base line, means mounting said image holders and telescope with respect to each other so that the image is seen when looking through the telescope, two links adapted to be universally turned about axes to turn the image holders into positions corresponding to the angles at which the photographs were taken, one of said turning axes being common to both links, each link being operatively connected to an image holder, and rectifying means operatively connected to each image holder for eliminating the errors in the projection arising from the parallelism of movements between image holders and links.

4. An optical apparatus, in combination, a stationary binocular telescope, two universally movable image holders each fitted with an objective and adapted to hold each a photographic plate of two photographs taken at different angles at the ends of a base line, means mounting said telescope and image holders relatively to each other so that the image is seen when looking through the telescope, two links adapted to be universally turned, each link being operatively connected to an image holder to turn the holders into positions corresponding to the angles at which the photographs were taken, an elevation slide a polar arm, the length of which may be varied, said arm effecting the movement of said slide and the effective length of said arm being determined by the position of said slide, and rectifying means operatively connected to each image holder for eliminating the errors in the projection arising from the parallelism of movements between image holders and links.

5. An optical apparatus, in combination, a stationary binocular telescope, two universally movable image holders each fitted with an objective and adapted to hold each a photographic plate of two photographs taken at different angles at the ends of a base line, means mounting said telescope and holders relatively to each other so that the image is seen when looking through the telescope, an elevation slide, a polar arm operatively connected to said elevation slide and adapted to turn about an axis, a second polar arm operatively connected to said first polar arm and adapted to turn about the same axis and by the same angular amount as the said first polar arm, two links adapted to be universally turned, each link being operatively connected to an image holder to turn the holders into positions corresponding to the angles at which the photographs were taken, and rectifying means operatively connected to each image holder for eliminating the errors in the projection arising from the parallelism of movements between image holders and links.

In testimony that I claim the foregoing as my invention, I have signed my name.

HEINRICH WILD.